United States Patent [19]

Bernard et al.

[11] Patent Number: 5,505,913
[45] Date of Patent: Apr. 9, 1996

[54] PROCESS FOR PREPARING DISILANE FROM MONOSILANE BY ELECTRIC DISCHARGE AND CRYOGENIC TRAPPING AND NEW REACTOR FOR CARRYING IT OUT

[75] Inventors: Fréderic Bernard, Paris; Valérie Borg; Pierre Didier, both of Grenoble; Daniel Guerin, Chelles; Michel Gastiger, Orsay; Pierre Karinthi, Jouy en Josas; Alain Villermet, Viroflay; Antoine Willemot, Sceaux, all of France

[73] Assignee: L'Air Liquide, Societe Anonyme Pour L'Etude et L'Exploitation des Procedes Georges Claude, Paris, France

[21] Appl. No.: 462,677

[22] Filed: Jun. 5, 1995

Related U.S. Application Data

[62] Division of Ser. No. 206,847, Mar. 7, 1994, Pat. No. 5,478,453.

[30] Foreign Application Priority Data

Mar. 11, 1993 [FR] France ................................ 9302802

[51] Int. Cl.⁶ .................................................. B10J 19/12
[52] U.S. Cl. .............................. 422/186.04; 422/186.19; 422/906; 422/186
[58] Field of Search ........................... 422/186, 186.04, 422/906, 186.19

[56] References Cited

U.S. PATENT DOCUMENTS

| | | | |
|---|---|---|---|
| 4,568,437 | 2/1986 | Dickson | 204/164 |
| 4,774,062 | 9/1988 | Heinemann | 422/186.19 |
| 4,792,460 | 12/1988 | Chu et al. | 427/35 |
| 4,877,588 | 10/1989 | Ditzler et al. | 422/186.19 |
| 4,908,189 | 3/1990 | Staubach | 422/186.19 |
| 4,960,569 | 10/1990 | Fouell et al. | 422/186.19 |
| 5,008,087 | 4/1991 | Batchelor | 422/186.22 |
| 5,306,471 | 4/1994 | Harbert et al. | 422/186.19 |
| 5,354,541 | 10/1994 | Sali et al. | 422/186.07 |
| 5,382,414 | 1/1995 | Lautenschläger | 422/186 |

FOREIGN PATENT DOCUMENTS 127214   7/1985   Japan.

OTHER PUBLICATIONS

Two abstracts corresponding to JP-A-61 106 411 of 24 May 1986.

Primary Examiner—Donald P. Walsh
Assistant Examiner—Daniel Jenkins
Attorney, Agent, or Firm—Browdy and Neimark

[57] ABSTRACT

The invention relates to a process for producing disilane from monosilane, according to which gaseous monosilane is passed into a reaction zone where it is subject to an electric discharge generated by a high-frequency current.

3 Claims, 1 Drawing Sheet

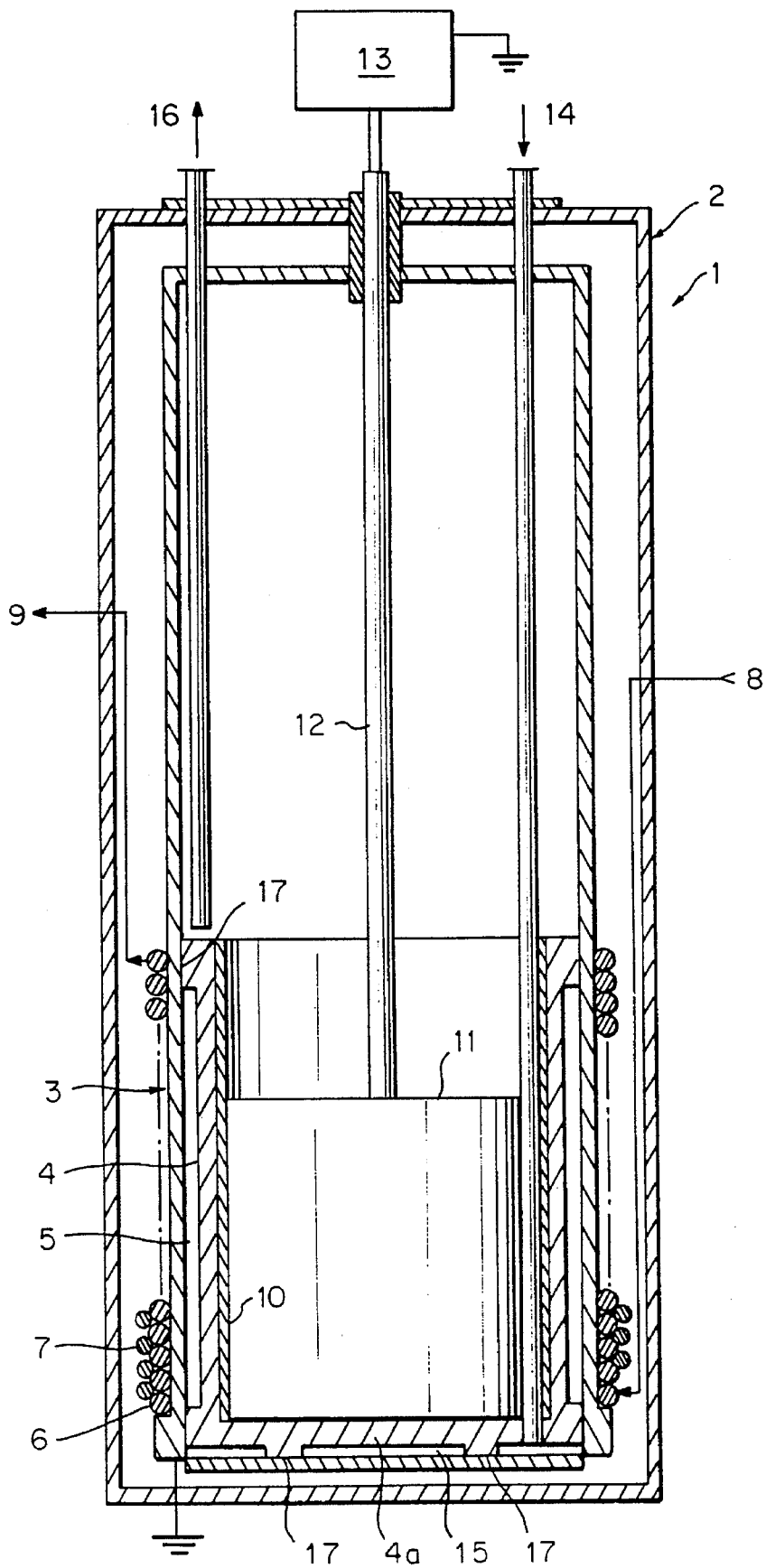

5,505,913

PROCESS FOR PREPARING DISILANE FROM MONOSILANE BY ELECTRIC DISCHARGE AND CRYOGENIC TRAPPING AND NEW REACTOR FOR CARRYING IT OUT

This is a division of parent application Ser. No. 08/206,847 filed Mar. 7, 1994 now U.S. Pat. No. 5,478,453.

SUMMARY OF THE INVENTION

The invention relates to a process for producing disilane from monosilane, according to which gaseous monosilane is passed into a reaction zone where it is subjected to an electric discharge generated by a high-frequency current, characterised in that a) the monosilane is used in the form of a mixture with at least one inert gas selected from the group formed by helium and argon, b) the pressure of the gaseous mixture in the reaction zone is between 0.1 and 3 bar, and c) the gaseous mixture is brought into contact, in the reaction zone under electric discharge, with a wall cooled to a temperature which is sufficiently low for the saturation vapour pressure of the disilane to be negligible, but not low enough for the monosilane to be condensable at the working partial pressure, and to a reactor for carrying it out.

Used in particular by the electronics industry.

The invention relates to a process for preparing disilane from monosilane by electric discharge and cryogenic trapping.

The use of disilane in the microelectronics industry to deposit semi-conducting amorphous silicon has very considerable advantages, i.e. increasing the deposition rates and reducing the deposition temperature. These advantages may be considerable, but they come up against the excessively high cost of disilane (10 times higher than that of monosilane).

Disilane is prepared at present with low yields by the chemical reaction of metal silicides with inorganic acids, or of hexachlorosilane with aluminium and lithium hydride.

Commercially available disilane is not only expensive, but is also often contaminated by impurities, such as chlorosilanes, siloxanes and hydrocarbon compounds.

A process for producing disilane from monosilane using a glow discharge and carried out at a very low pressure is also known from U.S. Pat. No. 568,437. However, the disilane yield obtained is only average (approximately 40% at best) and the fact that it is necessary to work in vacuo makes it difficult for a process of this kind to be used on an industrial scale.

It would therefore by very useful to have a process for producing disilane which gives good disilane yields free of troublesome impurities and is economical to carry out.

The aim of the invention is, inter alia, to provide a process of this kind.

The invention relates to a process for producing disilane from monosilane, according to which gaseous monosilane is passed into a reaction zone where it is subjected to an electric discharge generated by a high-frequency current, characterised in that a) the monosilane is used in the form of a mixture with at least one inert gas selected from the group formed by helium and argon, b) the pressure of the gaseous mixture in the reaction zone is between 0.1 and 3 bar, and c) the gaseous mixture is brought into contact, in the reaction zone under electric discharge, with a wall cooled to a temperature which is sufficiently low for the saturation vapour pressure of the disilane to be negligible, but not low enough for the monosilane to be condensable at the working partial pressure.

The process of the invention is based on the joint use of a plasma-forming electric discharge and a cryogenic trap situated in the reaction zone itself.

The electric discharge, which is of the type referred to as a silent discharge or corona discharge, acts on the monosilane molecules to create ions, radicals and excited molecules, and these species react with one another initially to form disilane, which can then be converted into trisilane, then into polysilanes and finally into hydrogenated amorphous silicon particles. According to the invention, a cryogenic trap situated in the reaction zone itself is provided in order to trap the disilane as it forms and before it is itself converted to a considerable degree into higher species.

The absolute pressure of the gaseous mixture can be from 0.1 to 3 bar, preferably 1 to 1.3 bar. Below 0.1 bar and above 3 bar, the equipment required becomes too cumbersome. In addition, above 3 bar, the proportion of monosilane in the gaseous mixture is limited to low levels, otherwise the voltage required to start the discharge may become too high and cause breakdowns.

The composition of the gaseous mixture depends largely on the operating pressure, as it has been found that the partial pressure of the starting monosilane must be situated between 0.01 and 0.1 bar, preferably between 0.04 and 0.08 bar, a partial pressure of less than 0.01 bar giving a low yield of the desired disilane, and on the fact that the starting voltage for the electric discharge is an increasing function of the partial pressure of the silane in the reaction zone, a partial monosilane pressure of more than 0.1 bar requiring a high starting voltage for the electric discharge which can cause breakdowns which may damage the equipment.

If, therefore, the process is carried out at a pressure close to the lowest possible pressure (0.1 bar), monosilane can constitute the vast majority of the gaseous mixture. In the preferred case in which the process is carried out at atmospheric pressure or at a slightly higher pressure, the gaseous mixture advantageously contains 1 to 10%, preferably 4 to 8% by volume of $SiH_4$ and 90 to 99%, preferably 92 to 96% by volume of the said inert gas.

It should be noted that, in addition to monosilane and the inert gas, the gaseous mixture can include a small quantity (e.g. less than 10% by volume) of hydrogen, without this having any adverse effect on the process.

The frequency of the electric current would appear to influence the disilane yield although the reasons for this are not clear. E.g. it has been found that with the installation available and described hereinbelow, a frequency of 3 kHz greatly improves the disilane yield compared to a frequency of 50 kHz. A frequency of 1 to 10 kHz, in particular 2 to 5 kHz, would therefore appear to be advisable in accordance with our present knowledge.

The residence time of the gaseous mixture in the reaction zone is advantageously short, e.g. less than 10 seconds, preferably less than 4 seconds and better still less than 2 seconds.

Moreover, the temperature of the cold wall is very important. It must be sufficiently cold for the saturation vapour pressure of the disilane to be negligible, but insufficiently cold for the monosilane to be condensable at the partial working pressure. It has been found that a cold wall temperature from −120° C. to −145° C. is usually satisfactory for the purposes of the invention.

The conditions stipulated hereinabove are of course only given by way of example and are in no way limiting.

Disilane yields (number of moles of disilane formed compared to the theoretical maximum number of moles) greater than 50% and able to reach values as high as 95% and more can be obtained with the process of the invention.

The invention also relates to a new reactor which can be used, inter alia, to carry out the process of the invention.

More precisely, the invention relates to a reactor comprising a reaction chamber, a conduit for continuously supplying this chamber with a gaseous mixture, a conduit for continuously discharging the residual gas having traversed the reaction chamber and means for establishing an electric discharge through the reaction chamber, comprising a pair of electrodes and a high-frequency electric current source, characterised in that the reaction chamber is delimited at least partially by a wall which can be cooled to a very low temperature.

The wall is preferably cooled to a temperature of $-120°$ C. or lower.

According to one particular preferred embodiment, the reaction chamber is delimited by two concentric cylindrical elements, wherein the inner cylindrical element is made of a dielectric material and is provided with a metal coating on its surface opposite the outer cylindrical element, and the outer cylindrical element is made of a metal and can be cooled externally by means of a coil traversed by a coolant.

By virtue of the fact that a metal-coated dielectric material is used to form both one of the walls of the reaction chamber and one of the electrodes, it is possible to obtain a uniform electric discharge and to prevent the formation of hot spots in the plasma formed.

The outer cylindrical element is advantageously also provided with an electric heating resistor so that it is possible to regulate the temperature of the cooled wall to a selected temperature set point greater than that normally produced by the coolant by alternately passing the coolant into the coil and operating the heating resistor as required.

The invention will now be described with reference to the accompanying drawings and the examples given hereinafter.

In the drawings, the single FIGURE is a diagrammatic sectional view of a reactor according to the invention.

This reactor, designated in general by the reference numeral 1, is formed by a sealed enclosure formed by an outer wall 2 and an inner wall 3 of stainless steel at a distance from one another, between which the vacuum has been created for the purposes of thermal insulation. A concentric cylindrical element 4 is disposed in the interior of the lower part of the inner wall 3, these defining between them a reaction chamber 5, this lower part moreover being provided on its outer face with a cooling coil 6 and an electric heating resistor 7 wound around 6. A conduit 8 for supplying liquid nitrogen and a conduit 9 for discharging the gaseous nitrogen allow a cold current of gaseous nitrogen to be established in the coil. The inner cylindrical element 4, the base 4a of which is closed, is made of a dielectric material, e.g. alumina or borosilicate glass, and is provided on its face opposite the wall 3 with a metal coating 10, e.g. a silver-plated layer, connected by a contact 11 and a conductor 12 to a high-frequency electric source 13. The metal wall 3 for its part is connected to earth.

The reactor also comprises a conduit 14 for supplying the starting gaseous mixture, which traverses the base 4a of the element 4 and opens into a space 15 formed between the base 4a of the element 4 and the base of the wall 3, and a conduit 16 for discharging the residual gaseous mixture originating in the part of the enclosure situated above the chamber 5.

The cylindrical element 4 is held at a distance from the wall 3 and from the base of the enclosure by spacing elements 17 (forming an integral part of the element 4) distributed at regular intervals. The gaseous flux can pass between them.

By way of example, the reactor used in the following examples comprised cylindrical elements having a diameter of approximately 3 cm forming a space between them forming a reaction chamber, and having a thickness of approximately 1 mm. The height of the chamber was varied from 1 to 3 cm by simple exchange of the cylindrical element 4. The thickness of the dielectric material (alumina) forming the element 4 was approximately 1.5 mm.

EXAMPLES

Synthesis of disilane was carried out several times with the aid of the reactor just described. The operating conditions and the results obtained are summarised in the Table hereinafter.

The disilane formed condensed on to the cooled wall and remained on this wall in the form of a film and/or fell to the bottom of the reactor. At the end of the reaction period, the supplies of gaseous mixture and coolant were stopped and the reactor was purged with helium in order to remove the residual monosilane, then the disilane was collected in the form of a gaseous mixture with helium and a little trisilane naturally released from the reactor during the heating thereof. The gaseous mixture collected typically had the following composition, in percentages by volume:

disilane 60%
trisilane 1%
residual monosilane 1%
helium 38%.

As a variant, the reactor could be provided with means for recovering the product formed in the liquid state, e.g. by providing a bleed valve at the bottom of the reactor.

The following Table clearly shows the high disilane yields which can be obtained with the process of the invention.

The embodiments described are of course only given by way of examples and could be amended, inter alia, by substituting equivalent techniques without thereby going beyond the scope of the invention.

In particular, although the reactor of the invention has been described in association with the synthesis of disilane, it should be noted that the usefulness of this reactor is not limited to this specific application, but that it could be used for the synthesis of any chemical species which can be produced in an electric discharge, and that it is advantageous to trap it as it forms and before it is converted into other species.

It would also be possible to operate two reactors of the type described in alternation, one of them supplying a disilane application produced in a preceding synthesis operation, while the other is in the process of synthesising disilane, so that the user has a continuous source of disilane.

TABLE

| Ex. | T, °C.[1] | Flow rate[2] cm$^3$/min | Composition[3] | Pressure[4] bar | Height[5] cm |
|---|---|---|---|---|---|
| 1 | −135 | 50 | 95/5 | 1.05 | 3 |
| 2 | −135 | 100 | 95/5 | 1.31 | 3 |
| 3 | −135 | 100 | 95/5 | 1.25 | 3 |
| 4 | −135 | 100 | 95/5 | 1.25 | 3 |
| 5 | −135 | 100 | 95/5 | 1.25 | 3 |
| 6 | −135 | 100 | 95/5 | 1.25 | 3 |

TABLE-continued

| Example | (1) | (2) | (3) | (4) | (5) |
|---|---|---|---|---|---|
| 7 | −135 | 100 | 95/5 | 1.25 | 3 |
| 8 | −135 | 100 | 95/5 | 1.25 | 3 |
| 9 | −135 | 100 | 95/5 | 1.25 | 3 |
| 10 | −135 | 100 | 93/7 | 1.25 | 3 |
| 11 | −135 | 100 | 95/5 | 1.1 | 1 |
| 12 | −135 | 100 | 95/5 | 1.1 | 1.5 |
| 13 | −135 | 100 | 95/5 | 1.1 | 1.5 |
| 14 | −135 | 100 | 95/5 | 1.1 | 1.5 |
| 15 | −135 | 100 | 95/5 | 1.1 | 1.5 |
| A( | −150 | 100 | 95/5 | 1.25 | 3 |
| B( | −100 | 100 | 95/5 | 1.25 | 3 |

(outside the invention)

| Example | Power(6) W | Frequency(7) kHz | Duration(8) min | Yield(9) % |
|---|---|---|---|---|
| 1 | — | 50 | 30 | 56.5 |
| 2 | — | 50 | 30 | 57.3 |
| 3 | 12.6 | 3 | 30 | 75.3 |
| 4 | 10.5 | 3 | 30 | 76 |
| 5 | 8.5 | 3 | 30 | 84 |
| 6 | 4.5 | 3 | 30 | 70.7 |
| 7 | 4.5 | 3 | 35 | 76.2 |
| 8 | 4.5 | 3 | 60 | 70.4 |
| 9 | 4.5 | 3 | 150 | 56.7 |
| 10 | 3.2 | 3 | 30 | 64.4 |
| 11 | 4.2 | 3 | 50 | 55.4 |
| 12 | 4 | 3 | 50 | 83.2 |
| 13 | 5.2 | 3 | 50 | 88.4 |
| 14 | 5.4 | 3 | 50 | 90 |
| 15 | 6 | 3 | 50 | 95 |
| A (outside | N.A. | 50 | 30 | ~0 |
| B (the invention) | N.A. | 50 | 30 | 6.17 |

Notes:
(1)temperature of the cold wall
(2)flow rate of the supply of gaseous mixture
(3)composition of the helium/monosilane gaseous mixture in % by volume
(4)pressure prevailing in the reaction chamber
(5)height of the inner cylindrical element
(6)electrical power consumed, as determined by calorific measurements. The intensity of the electric current varied from 0.5 to 3 mA as the case may be
(7)frequency of the electric current maintaining the electric discharge
(8)duration of the example
(9)disilane yield compared to the theoretical quantity

We claim:

1. Reactor comprising a reaction chamber (5), a conduit (14) for continuously supplying this chamber with a gaseous mixture, a conduit (16) for continuously discharging the residual gas having traversed the reaction chamber and means for establishing an electric discharge through the reaction chamber, comprising a pair of electrodes (3, 10) and a high-frequency electric current source (13), characterised in that the reaction chamber is delimited at least partially by a wall (3) connected to a cooling means that cools wall (3) to a temperature of −120° C. or lower.

2. Reactor according to claim 1, characterised in that the reaction chamber is defined by two concentric cylindrical elements (3, 4), wherein the inner cylindrical element (4) is made of a dielectric material and is provided with a metal coating (10) on its surface opposite the outer cylindrical element (3), and the outer cylindrical element (3) is made of a metal and can be cooled externally by means of a coolant.

3. Reactor according to claim 1, characterised in that the outer cylindrical element (3) is also provided with an electric heating resistor (7) so that it is possible to regulate the temperature of the cooled wall to a desired temperature set point.

* * * * *